Aug. 19, 1941.          H. J. STOEVER          2,252,739
PROCESS FOR REMOVING CONDENSATES FROM GAS
Filed Oct. 18, 1938

Inventor
Herman J. Stoever
by his Attorney
Hugo G. Kenman

Patented Aug. 19, 1941

2,252,739

UNITED STATES PATENT OFFICE 2,252,739

PROCESS FOR REMOVING CONDENSATES FROM GAS

Herman J. Stoever, Ames, Iowa, assignor to The United Gas Improvement Company, a corporation of Pennsylvania Application October 18, 1938, Serial No. 235,693

8 Claims. (Cl. 62—175.5)

This invention pertains generally to the removal of condensible materials from gas, and pertains particularly to the recovery of valuable hydrocarbons from manufactured gas such as carburetted water gas, oil gas, coal gas, etc., although it is equally applicable to natural gas.

It is well known that condensible vapors may be removed from manufactured gas by lowering the temperature of the gas. It is found, however, that the gas contains certain materials which solidify or freeze at low temperatures necessary to remove substantial quantities of the more valuable hydrocarbons.

Examples of materials which solidify or freeze are water and benzol.

As a result of the freezing of certain of the materials contained in the gas a gradual stopping up of the gas passsages occurs due to the accumulation of frost. These accumulations not only interfere with efficient heat transfer, but eventually stop up the equipment.

It has been proposed to duplicate the gas cooling system and to alternately operate one system while the other is being thawed out.

A feature of this invention resides in alternately thawing out such systems without loosing the refrigeration stored up in the frost, in the cold metal, etc.

A further feature of the invention resides in the continuous lowering of the temperature of a gas to abstract condensibles therefrom.

A further feature of the invention resides in the efficient use of refrigeration in condensing materials from a gas.

A further feature of the invention resides in an efficient, simple and commercially feasible method for accomplishing the purpose intended.

Further features of the invention reside in the construction, arrangement and combinations of parts, and in the steps, combinations of steps and sequences of steps, all of which together with other features will become more apparent to persons skilled in the art as the specification proceeds, and upon reference to the drawing in which.

Figure 1:
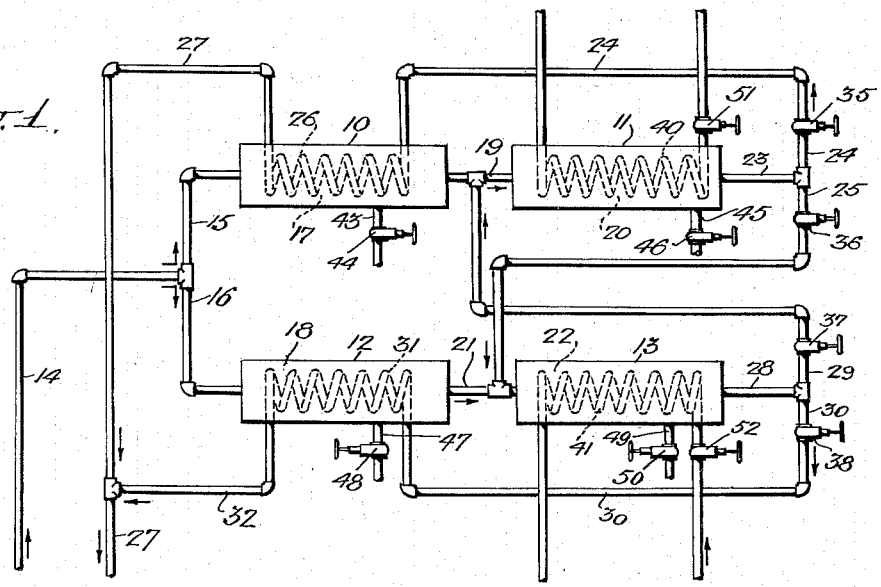
Figure 1 is a flow sheet illustrating one form of the invention.

Referring now more particularly to Figure 1, 10, 11, 12, and 13 are heat exchangers.

14 is a gas supply line leading from a source of gas to be treated (not shown).

Line 14 branches into lines 15 and 16.

Line 15 is connected to the inlet of fluid space 17 of heat exchanger 10, and line 16 is connected to the inlet of fluid space 18 of heat exchanger 12.

The outlet of fluid space 17 is connected by line 19 to the inlet of fluid space 20 of heat exchanger 11, and the outlet of fluid space 18 is connected by line 21 to the inlet of fluid space 22 of heat exchanger 13.

The outlet of fluid space 20 is connected to line 23 which divides into lines 24 and 25.

Line 24 leads to the inlet of fluid space 26 of heat exchanger 10, the outlet of which is connected to line 27 which leads to a holder for finished gas, not shown.

Line 25, on the other hand, connects with line 21.

The outlet of fluid space 22 of heat exchanger 13 is connected to line 28 which branches into lines 29 and 30.

Line 30 is connected to the inlet of fluid space 31 of heat exchanger 12, the outlet of which is connected to line 32 which connects with line 27.

Line 29, on the other hand, connects with line 19.

Lines 24, 25, 29, and 30 are provided with valves 35, 36, 37 and 38 respectively.

Fluid space 40 of heat exchange 11 is connected across a supply of refrigerant, not shown.

Likewise, fluid space 41 of heat exchanger 13 is connected across a supply of refrigerant, not shown.

In describing the operation of the apparatus shown in Figure 1, let it be assumed that valves 35, and 37 are open and valves 36 and 38 closed, that heat exchangers 12 and 13 are frosted up and that heat exchangers 10 and 11 are defrosted. Valve 51 is open and valve 52 closed.

The incoming relatively warm gas to be treated flows through line 14 and divides between lines 15 and 16 according to the relative openings of valves 35 and 37.

The gas flowing through line 15 flows through fluid space 17, line 19, fluid space 20, line 23, line 24, fluid space 26, and line 27 to storage.

As this gas flows through fluid space 17, it is brought into heat exchange relationship with the cooled outgoing gas flowing through fluid space 26, thus recovering the cold therefrom.

This pre-cooled gas upon reaching fluid space 20 is brought into heat exchange relationship with refrigerant flowing through fluid space 40.

The condensate produced in fluid space 17 is withdrawn through line 43 controlled by valve 44, and the condensate produced in fluid space 20 is withdrawn through line 45 controlled by valve 46.

It was assumed that heat exchangers 12 and 13 were frosted up and, therefore, required defrosting. Warm gas for this purpose flows through line 16, fluid space 18, line 21, fluid space 22, line 28 and then line 29 from which the gas thus pre-cooled enters into line 19. The flow of gas through the circuit between line 16 and line 19 is sufficient to adequately defrost heat exchangers 12 and 13, and the liquid thus produced is drawn off through lines 47 and 49 respectively. Flow in line 47 is controlled by valve 48, and flow in line 49 is controlled by valve 50.

Thus cold stored up in heat exchangers 12 and 13 is efficiently recovered and at the same time heat exchangers 12 and 13 are defrosted.

As the process proceeds heat exchangers 10 and 11 eventually become frosted up whereupon valves 36 and 38 are opened and valves 35 and 37 closed. Valve 51 is now closed and valve 52 opened.

The incoming gas still divides between lines 15 and 16, but the relative amounts are no longer determined by the relative openings of valves 35 and 37, but by the relative openings of valves 36 and 38.

That portion of the gas which flows through line 16 enters fluid space 18 wherein it is pre-cooled by the cold treated gas flowing through fluid space 31 to storage. From fluid space 18 the gas flows through line 21 into fluid space 22 wherein it is cooled by refrigerant flowing through fluid space 41, valve 52 having been opened for this purpose.

The cooled gas flows out through line 28, line 30, fluid space 31, line 32 and line 27 to storage.

Condensate produced in fluid space 18 is drawn off through line 47, and condensate produced in fluid space 22 is drawn off through line 49.

That portion of the gas which flows through line 15 flows through fluid space 17, line 19, fluid space 20, line 23 and line 25 from which the pre-cooled gas enters line 21. The flow of gas through the circuit between line 15 and line 21 is sufficient to adequately defrost heat exchangers 10 and 11, and the liquid thus produced is drawn off through lines 43 and 45 respectively.

When heat exchangers 12 and 13 become frosted up the above cycle is repeated.

By this means the cold stored up in the frost and in the metal of heat exchangers requiring defrosting is substantially completely recovered along with the materials making up the frost.

It will be seen that the temperatures at various points in the system are subject to considerable variation, if desired or required. Therefore, the following is to be considered as merely illustrative.

The incoming gas may enter at say 70° F. through line 14.

Let us assume that heat exchangers 10 and 11 are on the gas cooling part of the cycle, and heat exchangers 12 and 13 on the defrosting part of the cycle. Thus valves 35 and 37 will be open and valves 36 and 38 closed. Valve 51 will be open and valve 52 closed.

The gas enters fluid space 17 through line 15 at 70° F., and leaves fluid space 17 at 0° F.

Gas enters fluid space 18 through line 16 at 70° F., leaves fluid space 18 at 60° F., enters fluid space 22 at 60° F., leaves fluid space 22 at 10° F., and enters line 19 at 10° F.

Due to the difference in temperature of the gas entering line 19 from fluid space 17, and the gas entering line 19 from fluid space 22, the gas entering fluid space 20 is at 5° F.

Due to the cold supplied by the refrigerant flowing through fluid space 40, the gas leaves fluid space 20 at —80° F., enters fluid space 26 at this temperature, and leaves fluid space 26 at 60° F. at which temperature it is delivered to storage.

During the other part of the cycle, namely, when valves 35 and 37 are closed and valves 36 and 38 are open, the same temperatures apply but to the alternate parts of the system.

It will be understood, of course, that the temperatures given are hardly more than rough approximations and are merely by way of explanation.

Figure 2:
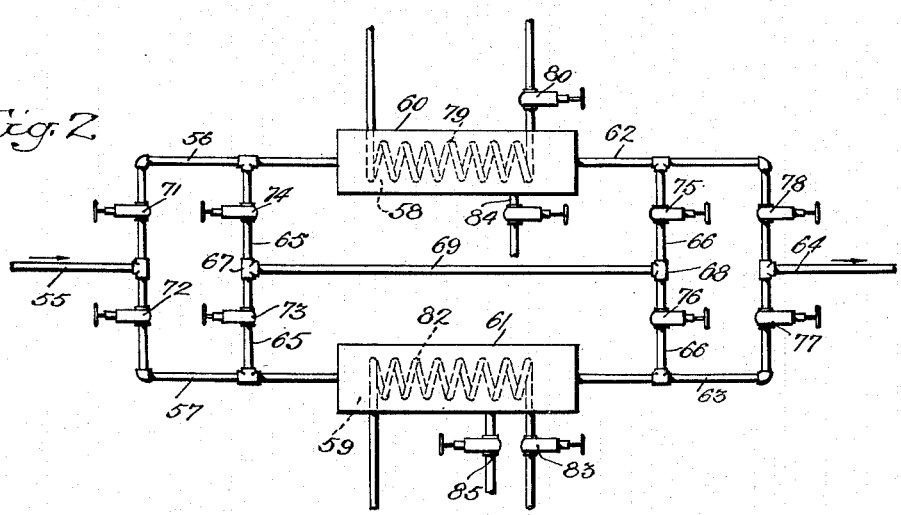
Figure 2 is a flow sheet illustrating another form of the invention.

Referring now to Figure 2, line 55 for incoming gas is connected to a supply, not shown.

Line 55 divides between lines 56 and 57 which lead to fluid spaces 58 and 59 of heat exchangers 60 and 61 respectively.

The outlets of fluid spaces 58 and 59 are connected to lines 62 and 63 respectively, which lead to a common outlet line 64 which, in turn, may lead to a suitable point such as a holder, not shown.

Lines 56 and 57 are connected by a line 65 and lines 62 and 63 are connected by a line 66. Line 65 at an intermediate point 67 and line 66 at an intermediate point 68 are connected by line 69.

Line 56 is provided with a valve 71, line 57 with a valve 72, line 65 on opposed sides of intermediate point 67 with valves 73 and 74, line 66 on opposed sides of intermediate point 68 with valves 75 and 76, line 63 with valve 77, and line 62 with valve 78.

Fluid space 79 of heat exchanger 60 is connected across a refrigerant supply not shown, the flow of refrigerant being controlled by valve 80, and fluid space 82 of heat exchanger 61 is connected across a refrigerant supply not shown, the flow of refrigerant being controlled by valve 83.

Liquid is drained from fluid space 58 through line 84 and liquid is withdrawn from fluid space 59 through line 85.

The operation of the apparatus shown in Figure 2 is as follows:

Let it be assumed that the system has been operating and that heat exchanger 60 has become frosted up.

During such operation, which resulted in the frosting up of heat exchanger 60, all of the even numbered valves were open and all of the odd numbered valves closed. Consequently, the incoming gas flowed through line 72, fluid space 59, line 63, line 66, line 69, line 65, line 56, fluid space 58, line 62 to line 64. The warm gas upon passing through fluid space 59 removed any frost therein, the liquid being drained through line 85.

Pre-cooled gas entered fluid space 58 wherein it was further cooled by the flow of refrigerant through fluid space 79, the condensate being removed through line 84. The finished gas passed off through line 62 and line 64 to storage.

To defrost heat exchanger 60, the even numbered valves are closed and the odd numbered valves opened, whereupon the incoming warm gas flows through line 56, fluid space 58 to melt the frost, line 62, line 66, line 69, line 65, fluid space 59, wherein it is further cooled by refrigerant flowing through fluid space 82, line 63 and line 64 to storage.

As in the previous part of the cycle, liquid is drained from fluid space 58 through line 84 and from fluid space 59 through line 85.

As a result of the foregoing the incoming relatively warm gas acts as a thawing agent, and the frosted heat exchanger is thawed out without a loss in refrigeration.

It is, of course, to be understood that the gas flowing out through line 84 might be brought into heat exchange relationship with any suitable fluid for recovering the cold therein, for instance, with the incoming gas.

It will be seen that the temperatures throughout this form of the invention might be controlled more or less at will. Therefore, the following is merely illustrative.

The gas may enter the system through line 55 at say -20° F. Assuming that the odd numbered valves are open and the even numbered valves closed, the gas will enter fluid space 58 at this temperature. The gas will leave fluid space 58 at say -30° F., and enter fluid space 59 at this temperature. The gas will leave fluid space 59 at say -80° F. and pass out of the system at this temperature.

As pointed out above the outgoing gas has considerable cold stored up in it which might be recovered by any suitable means such as by bringing the gas into heat exchange relationship with gas at atmospheric temperature, and thus provide a reduced temperature for gas flowing to line 55.

When the odd numbered valves are closed and the even numbered valves are open, the temperatures in the above illustration are, of course, reversed in the system.

By the practice of my invention the most troublesome difficulty in the recovery of gas constituents by refrigeration is efficiently and effectively removed without resort to complicated apparatus or involved operations.

The system lends itself to considerable variations, both as to construction and operation, and as to the temperatures obtained at various points.

For instance, while the cold treated gas is normally passed alternately through fluid spaces 26 and 31 to recover the cold therefrom, any other refrigerant might be utilized in these fluid spaces, and the treated gas may be sent to storage with or without recovering the cold therefrom.

Furthermore, while, as the invention has been more particularly described, fluid space 41 is off-stream when fluid space 40 is on-stream and vice versa, it is to be understood that when fluid space 40 is on-stream fluid space 41 might be partly on-stream but preferably not sufficient to prevent defrosting. Likewise, when fluid space 41 is on-stream fluid space 40 might be partly on-stream but preferably not sufficient to prevent defrosting. The same applies in Figure 2, that is the refrigerant in the defrosting heat exchanger might be partly on-stream particularly if this does not prevent defrosting.

Moreover, in Figure 2 when the odd numbered valves are open and the even numbered valves closed, so that the gas first passes through heat exchanger 60 and then through heat exchanger 61, valve 72 also might be opened to any desired extent so that a part of the gas will flow directly to heat exchanger 61.

Likewise, when the even numbered valves are open and the odd numbered valves closed, valve 71 might be opened to any desired extent so that a part of the incoming gas is conducted directly to heat exchanger 60.

It is, of course, understood that the invention is adapted to the use of any desired number of heat exchangers, the number shown and more particularly described being by way of illustration.

From the foregoing it will be seen that a fundamental feature of invention common to the two forms more particularly described, resides in passing the gas to be treated serially through a plurality of heat exchangers having cooling means, said heat exchangers being divided into two portions, said gas passing through said portions with each portion alternately upstream and downstream of gas flow in said series, and operating the cooling means of said portions at normal load only when said portions are in downstream position in said series, thus permitting the incoming gas to thaw frost in said portions when said portions are in upstream position in said series.

Another fundamental feature of invention common to the two forms particularly described, resides in passing the gas to be treated through two series of heat exchangers connected in parallel, said heat exchangers having gas cooling means, dividing said gas between the two series of heat exchangers, alternately operating the cooling means in said two series of heat exchangers at normal load, and conducting the gas from the terminal of each series of heat exchangers when its cooling means is not operating at normal load to an upstream point of the other series of heat exchangers.

It is to be understood that the above description is by way of illustration and that changes, omissions, additions, substitutions, and/or modifications might be made within the scope of the claims without departing from the spirit of the invention which is intended to be limited only as required by the prior art.

I claim:

1. A process for removing condensible materials from a gas by the reduction in temperature of said gas, said gas containing a component which solidifies at the temperature employed, comprising dividing said gas into two streams, passing each stream through separate heat exchange means having gas-cooling means while alternately combining each of said streams after leaving its respective heat exchange means with the other of said streams before the passage of said other stream through its respective heat exchange means, and operating the cooling means of each heat exchange means at a temperature sufficiently low to cause solidification of a gas component only when the combined streams pass therethrough.

2. A process for removing condensible materials from a gas by the reduction in temperature of said gas, said gas containing a component which solidifies at the temperature employed, comprising dividing said gas into two streams, passing each stream through a separate heat-exchanger having gas cooling means while alternately combining each of said streams after leaving its respective heat exchanger with the other of said streams adjacent the entry of said other stream into its respective heat exchanger, and operating the cooling means of each heat exchanger at a temperature sufficiently low to cause solidification of a gas component only when the combined streams pass therethrough.

3. A process for removing condensible materials from a gas by the reduction in temperature of said gas, said gas containing a component which solidifies at the temperature employed, comprising dividing said gas into two streams, passing each stream through separate heat exchange means having gas cooling means while alternately combining each of said streams after leaving its respective heat exchange means with the other of said streams before the passage of said other stream through its respective heat exchange means, and operating the cooling means of each heat exchange means only when the combined streams pass therethrough.

4. A process for removing condensible materials from a gas by the reduction in temperature of said gas, said gas containing a component which solidifies at the temperature employed, comprising dividing said gas into two streams, passing each stream through separate heat exchange means having cooling means while alternately combining each of said streams after leaving its respective heat exchange means with the other of said streams before the passage of said other stream through its respective heat exchange means, operating the cooling means of each heat exchange means at a temperature sufficiently low to cause solidification of a gas component only when the combined streams pass therethrough, and bringing the relatively cold treated gas into heat exchange relationship with relatively warmer incoming gas.

5. A process for removing condensible materials from a gas by cooling said gas, said gas containing materials which produce a frost at the temperatures employed, comprising passing said gas through two series of heat exchangers connected in parallel, said heat exchangers having gas cooling means, said gas dividing between said two series of heat exchangers, alternately operating the cooling means in said two series of heat exchangers at normal load, and conducting the gas from the terminal of each series of heat exchangers when its cooling means is not operating at normal load to an up-stream point of the other series of heat exchangers.

6. A process for removing condensible materials from a gas by cooling said gas, said gas containing materials which produce a frost at the temperatures employed, comprising passing said gas through two series of heat exchangers connected in parallel, said heat exchangers having gas cooling means, said gas dividing between said two series of heat exchangers, alternately operating and shutting off the cooling means in said two series of heat exchangers, and conducting the gas from the terminal of each series of heat exchangers when its cooling means is shut off to an intermediate point of the other series of heat exchangers.

7. A process for removing condensible materials from a gas by cooling said gas, said gas containing materials which produce a frost at the temperatures employed, comprising passing said gas through two series of heat exchangers connected in parallel, said heat exchangers having gas cooling means, said gas dividing between said two series of heat exchangers, alternately operating the cooling means in said two series of heat exchangers at normal load, conducting the gas from the terminal of each series of heat exchangers when its cooling means is not operating at normal load to an up-stream point of the other series of heat exchangers, and supplying a part of the refrigeration for cooling incoming gas by conducting the gas from the terminal of each series of heat exchangers when its cooling means is operating at normal load back to a heat exchanger earlier in said series for heat exchange with incoming gas.

8. A process for removing condensible materials from a gas by cooling said gas, said gas containing materials which produce a frost at the temperatures employed, comprising passing said gas through two series of heat exchangers connected in parallel, said heat exchangers having gas cooling means, said gas dividing between said two series of heat exchangers, alternately operating and shutting off the cooling means in said two series of heat exchangers, conducting the gas from the terminal of each series of heat exchangers when its cooling means is shut off to an intermediate point of the other series of heat exchangers, and supplying a part of the refrigeration for cooling incoming gas by conducting the gas from the terminal of each series of heat exchangers when its cooling means is operating back to a heat exchanger earlier in said series for heat exchange with incoming gas.

HERMAN J. STOEVER.